Dec. 28, 1937.  H. D. STUCK ET AL  2,103,344
PROCESS OF MAKING LININGS FOR JORDAN ENGINE SHELLS
Original Filed June 2, 1934   3 Sheets-Sheet 1
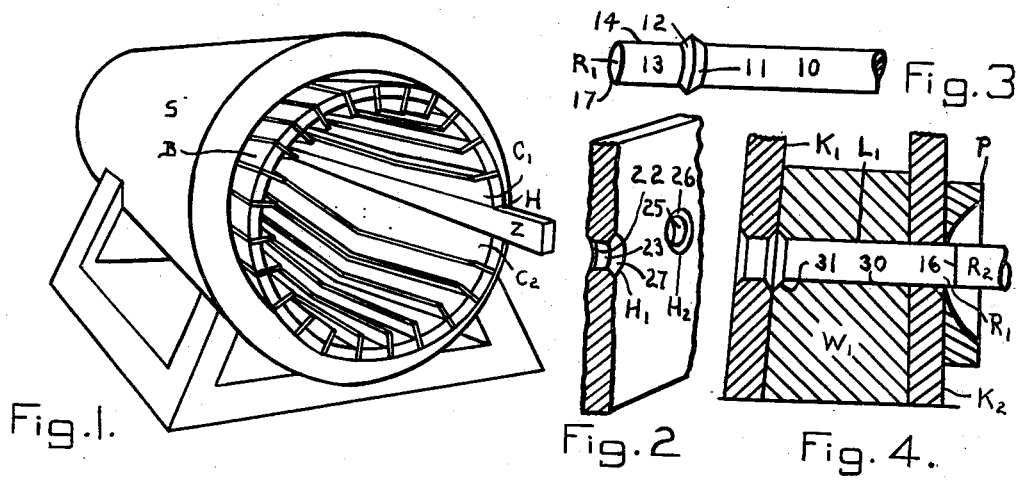
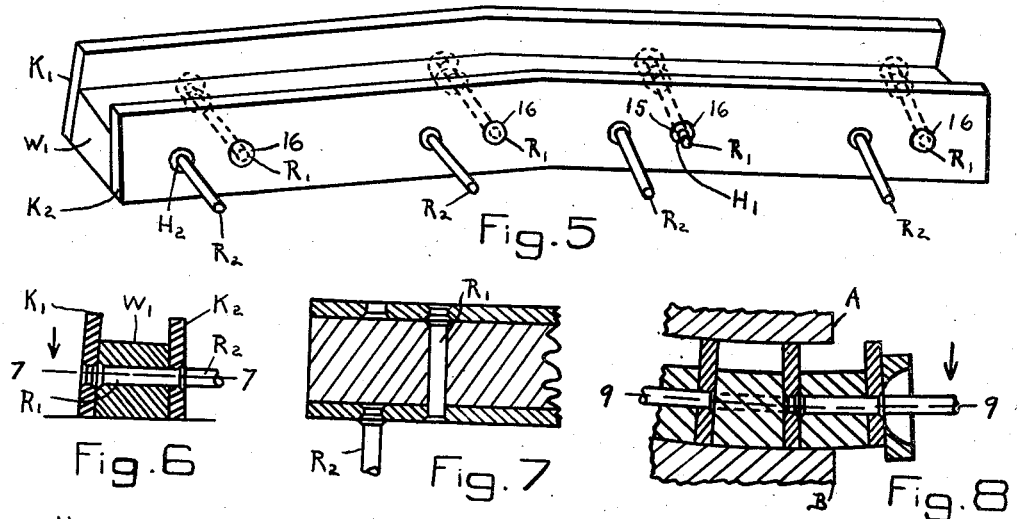

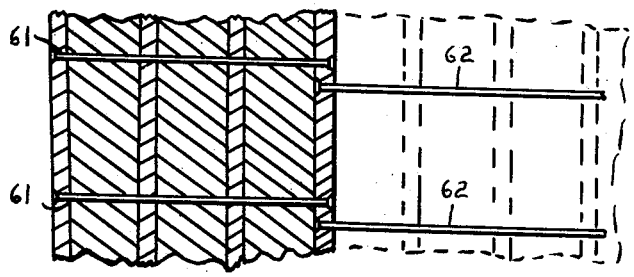
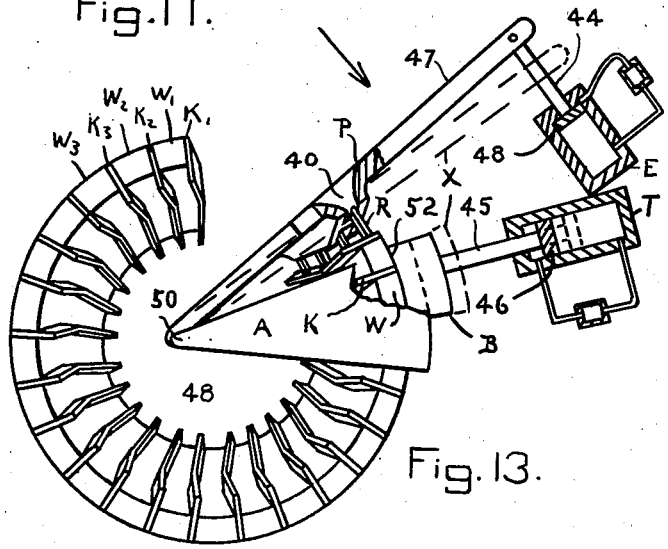
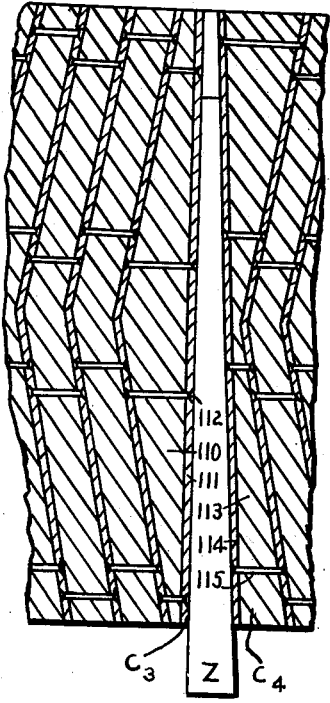
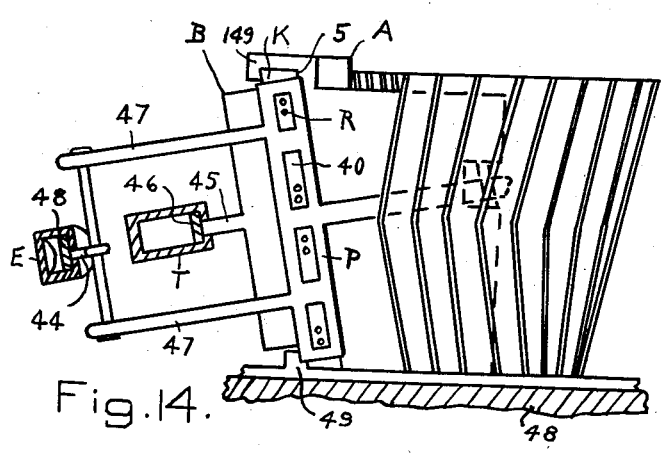
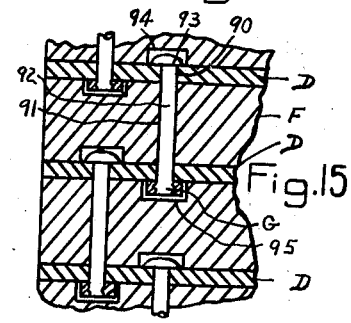
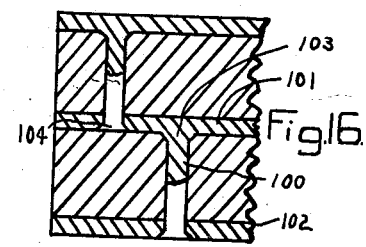
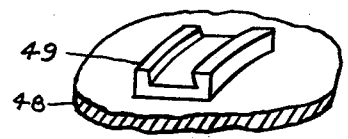

Patented Dec. 28, 1937

2,103,344

UNITED STATES PATENT OFFICE 2,103,344

PROCESS OF MAKING LININGS FOR JORDAN ENGINE SHELLS

Harold D. Stuck, Lawrence, and Philip A. De Nault, North Andover, Mass., assignors to John W. Bolton & Sons, Inc., Lawrence, Mass., a corporation of Massachusetts Refiled for application Serial No. 728,780, June 2, 1934. This application February 25, 1937, Serial No. 127,700

4 Claims. (Cl. 92—27)

This invention relates to the filling or linings of Jordan engines. This application is refiled for the applicants' abandoned application Serial No. 728,870, filed June 2, 1934.

A Jordan engine includes a frustro-conical shell on the inside of which is a filling formed of knives or knife edges which project radially inward and a plug of frustro-conical shape which has knives or bars projecting outward radially and which revolve inside the shell.

Formerly these shell fillings were built up in the shell itself by putting in position alternately knives and wooden separators, cheek pieces and holding bars and tightening the knives and separators together by the action of wedges driven in from the large end. More recently, however, all metal fillings such as described in his Patent No. 946,752 by Bahr have been used and fillings in which the knives and separators had holes and were strung on and held in position by wires or rods which passed through these holes, as see Abbe No. 235,844. Another type is such as shown in patent to Bolton No. 1,642,327 in which the knives and separators are held together by a thin metal jacket and still another type like patent to Martindale No. 1,494,265 where the knives and separators are held together by wires and babbitt.

These fillings have been formed in gangs of one-eighth, one-quarter or one-half circle and have also been made in complete circles of 360° but more often as a complete 360° filling, but with a longitudinal slot to permit the lining to be inserted in the shell and then expanded by means of a wedge driven into the slot.

A large proportion of fillings, whether of the old unassembled type or the later preconstructed type, use wooden separators between the knives and the well known swelling of wood in water has been utilized to help hold the filling firmly in place and against rotation. The swelling of the wood, when wet, if confined circumferentially, pushes out radially against the inside of the shell and helps to prevent the filling from revolving with the plug.

In making a preconstructed or preassembled filling, it has been found desirable, if not necessary, to provide a mould or jig, corresponding in size with the inside surface of the shell to be fitted, and to use this as a mould for a cast filling or as a jig or form for assembling the knives and separators of a compound filling. The axis of a Jordan shell in place is horizontal and it is much easier to work with a mould or jig or form having a vertical axis.

In assembling the knives and woods of a preconstructed filling in a jig or form, it has been the universal custom to place in position, either around the whole circumference or with the ends resting against stops, a substantial number of knives and separators ending with oppositely disposed cheek pieces with adjoining straight faces, and then to drive radially or longitudinally a number of assembling wedges between the faces of adjoining members so as to force the parts together, to fill voids and to make a close circumferential fit.

These wedges are usually merely temporary and the process is repeated several times to get the required tightness, the assembling wedges being replaced by others and some or all being left out of the complete assembly.

The parts may be held in place as described above by being strung on wires or by babbitt or in a jacket or they may be held at the ends.

These assembling wedges are generally driven in by powerful sledge hammers or bars by repeated blows and it is obvious that the surfaces along which the wedges must pass must be free from any sort of obstructions such as bolts, nuts or anything of that kind and it is also obvious that when a wedge is started, the pressure is almost entirely at the large end of the assembly, being gradually transmitted to the small end as the wedge is driven in.

It is also obvious that there is great loss of pressure power from blows, between the wedge and the cheek pieces and that the heavy pounding, necessary in driving in a wedge, is objectionable because it may displace the parts and may also damage and preclude the use of certain types of separators.

The crowding or squeezing together of the knives and separators, either in the shell or in a mould or jig is objectionable because each wedge is driven by a blow. The blows on each wedge are objectionable because the pressure is applied in only one place, it is sudden and has a tendency to displace the parts, to weaken the parts and precludes the use of certain types of separators.

Moreover, the parts must be assembled in a truncated, conical mould and whether wedges are driven longitudinally or radially, the successive blows tend to distort the assembly.

This invention provides for applying great pressure which may be of the hydraulic type, along substantially the entire length of successive assemblies of knives and separators and this pressure may be applied and the parts may be assembled without the use of a jig, form or mould. By successively applying substantially the same pressure along substantially the entire length of a knife or separator at substantially the same time in assembling the whole or part of a preassembled lining for a Jordan engine shell, not only are the voids filled thoroughly, but the assembly can be made so that it will almost perfectly fit the shell.

However, it is usually made with a split for a fitting wedge, by which it is expanded in a well-known manner so as to fit the shell.

While we prefer to use a steady, powerful pressure such as may be produced by a hydraulic press, a screw press or other means of squeezing and we prefer to use a pressure which can be controlled and determined in advance and to apply this successively to relatively small groups of knives and separators, we recognize that pressure might be applied in some other way.

Our purpose is to obtain a uniform degree of tightness of the parts and one which is greater and more evenly distributed than by known methods of assembling.

Preferably after each successive group is assembled, we prefer to lock the parts thereof from displacement in service thus providing a stronger unit and one which will stand greater strains and stresses than any known assembly of separate members without injury.

By our process we secure maximum and uniform tightness between the parts circumferentially around the unit and we obtain this by exerting a known and uniform pressure upon each member of or sub-group of relatively small groups. By our process of assembling, we not only do away with wedging, but also with the necessity of using a mould, form or jig for shaping the filling. We may use guides as described herein or we may finish or set the complete split section of filling by forcing it into a mould after it is completely assembled.

We claim as new the process of applying regulated, predetermined pressure preferably of greater force than can readily be applied by wedging, to a small group of parts, preferably along the entire length at the same time and preferably of substantially the same force along the length and of adding to these groups by building step by step until a larger unit or section is formed, but also preferably of retaining or locking the members of each group successively in place while they are still under pressure.

This particular application has to do with the process or method of assembling the knives and separators in making a preassembled, bodily transportable filling for a Jordan engine shell.

Our preferred type of filling is of the staggered riveted type which is the subject of another application pending herewith, but our process may be used in forming fillings which are locked or held together in other ways. Some of such other fillings will be described herein.

We claim as new, the process of applying great, but steady and controlled pressure to a small group of members while held in position and of retaining or locking them in squeezed position by means different from the squeezing means during and after the squeezing means has been released.

Preferably such pressure and locking is applied to groups successively and the groups themselves are squeezed and locked together. The members of each group and the groups themselves may be held or locked in place during and after squeezing by rivets or similar devices, by curved wire rods headed at each end, by bolts, by welding, by being held at the ends or in various other ways or they may simply be held together by glue or cement after the individual parts have been uniformly squeezed together by great pressure.

In fact, the pressure may be so great as to destroy the natural elasticity or resiliency of the separators so that when the pressure is removed, they will retain their compressed size and shape at least until the assembly is introduced into a shell and subjected to moisture which may cause the separators to swell.

In the drawings, Fig. 1 is an isometric diagrammatic view of a Jordan shell with a lining such as produced by the process described herein partly inserted in the shell and with a wedge partly inserted in the split in the shell.

Fig. 2 is an isometric view of a broken section of a knife showing the construction of the rivet holes.

Fig. 3 is an isometric view showing part of one end of a rivet with a skirt.

Fig. 4 is a transverse sectional view through a first knife, a first separator and a second knife with one rivet passing through the various holes with an end projecting as it is before such an end is headed over.

Fig. 5 is an isometric view of a first knife and a second knife with a first separator between them with a second set of rivets projecting from the second knife and some of the first sets of rivets headed and some not headed.

Fig. 6 is a transverse sectional view of two knives with a separator after a rivet has been headed.

Fig. 7 is a horizontal sectional view on the line 7—7 of Fig. 6, the rivets and holes showing in full lines.

Fig. 8 is a vertical transverse sectional view similar to Fig. 6 showing a plurality of knives and separators with a plurality of rivets some headed and some not headed, the assembled parts being held in place by jaws and with a pressure plate in position to squeeze the parts together.

Fig. 9 is a sectional view looking down in the direction of the arrow on line 9—9 of Fig. 8.

Fig. 10 is a view similar to Fig. 4 showing a construction in which the rivets have no skirt, but are headed at both ends.

Fig. 11 is a sectional view similar to Fig. 9 showing a construction in which groups are made up of four knives and three separators held together by long rivets.

Fig. 12 is a sectional view showing how the cheek pieces can be attached on each side of the split and with a wedge driven part way into the split.

Fig. 13 is a diagrammatic plan view showing one type of machine which can be used in applying our process to the assembling of a lining such as described herein.

Fig. 14 is a diagrammatic elevation showing part of a machine such as shown in Fig. 13 suitable for using our process.

Fig. 14A is an isometric view showing in detail a bottom guide which may be used in assembling the members.

Fig. 15 is a view similar to Fig. 9 showing bolts in place of rivets.

Fig. 16 is a view similar to Fig. 9 showing a construction in which one end of a rod is welded to a knife and the other end is passed through a hole in another knife and either headed or welded in place.

Fig. 17 is an isometric view of an assembled Jordan shell lining of the split type with special cheek pieces riveted on.

Figure 17:
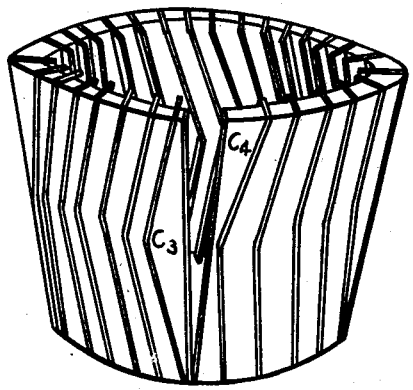

This is a successive process and for convenience the knives and separators as well as the rivets, as far as possible, will be designated by letters associated with numbers 1, 2, 3, etc. to indicate the relative position of the various parts as the Jordan filling lining section is built up.

Pressure might perhaps be applied successively by wedges driven in axially in the usual way lengthwise, but pressure so produced is not uniform and cannot be regulated nor predetermined.

We prefer, therefore, to use a machine such as described herein whereby the knives and separators are successively assembled and held in a vise while additional knives and separators are added and squeezed or pressed together by a definitely regulated pressure. Such pressure may be produced hydraulically, by screw mechanism, levers, or in any other way in which a steady uniform pressure can be applied in the successive building of a truncated conical filler for Jordan shells.

It is desirable that pressure should be applied at as many points as possible along the length of each knife or separator without interfering, however, with the clinching or locking of the locking devices, if any, used to hold the assembly together.

$K^1$ represents the first or starting knife which is the usual bent or angular type and is the same as the other knives except that one set of rivet holes may be omitted. As shown each knife has two sets of holes indicated by $H^1$ and $H^2$ but the holes $H^2$ may be omitted in the knife $K^1$ if desired.

In the preferred construction, the holes $H^1$ and $H^2$ are in line and down toward the base or outside of the knife so that they will register with similar holes such as indicated at $L^1$ or $L^2$ through the adjoining separator. Preferably each hole $H^1$ has a cylindrical part 23 each side being chamfered at 22 and 27 while each hole $H^2$ has a cylindrical part 25 only one side being chamfered at 26.

Each separator hole such as $L^1$ has a straight cylindrical part 30 and a chamfered part 31 and each rivet such as $R^1$ has a straight cylindrical part 10 which fits snugly in hole 30 and has a skirt which flares at 11 to fit chamfer 31 and contracts at 12 to fit the chamfer 22 and again is cylindrical at 13 to fit 23 and is headed over at 17 to fit the chamfer 27. At the other end, the part 19 fits the part 25 of hole $H^2$ in knife $K^2$ and is headed over at 16 to fit the chamfer 26.

It will be observed that the skirt and head on each rivet holds and registers in a knife such as $K^1$ and that the other head such as 16 locks a separator such as $W^1$ between two knives $K^1$ and $K^2$.

When starting, the four rivets $R^1$, $R^1$, $R^1$, $R^1$ are fastened to and stick out from knife $K^1$ and over these rivets is positioned the first separator $W^1$ and then beyond this a second knife $K^2$ from which project another set of rivets $R^2$ is positioned.

Before the first set of rivets $R^1$ are headed over at 16, pressure is applied to squeeze $K^1$ and $K^2$ together with $W^1$ between them, this pressure being applied between the sets of rivet holes, as shown.

In fixing each set of rivets by means of its skirt 11, 12, the end 13 may be cut off at 14 so that the head 17 will just fill the chamfer 27 and in the same way in assembling it may be desirable to have the other end 10 longer than necessary so that after pressure is applied to squeeze $K^1$, $K^2$, and $W^1$ together, each rivet such as $R^1$ can be cut off at 15 so that when headed over as at 16, it will just fill the chamfer 26.

It will be understood that usually the knives are the same thickness from top to bottom, but the separators are of keystone shape which means that their inside width is less than their outside width so that, as the assembly is built up, it assumes a predetermined circular form or rather follows the contour of a truncated cone so that a complete assembly such as B in Fig. 1 can be introduced into the Jordan shell such as S and can be expanded therein as by means of a wedge Z, there being left a lengthwise slot for the wedge between the cheek pieces indicatd by $C^1$ and $C^2$.

The same principle can, of course, be applied to a lining for a shell where the knives are of keystone shape and the separators of some other shape. In fact, it can be applied to assembling any known types of members, such as knives, separators of wood or other material, cheek pieces, anchor bars or wedges.

As shown in Fig. 11, instead of using groups of two knives and one separator, one of the outside knives of each group serving as an outside member of a second group, we can use groups such as of four knives with three separators held together by long rivets such as 61 and 62 which pass through the intermediate knives as well as the separators and lock together the outside knives of the alternating groups.

It will be observed that each outside knife of each group serves as an outside knife of two groups.

It is obvious also that a substantially complete section or segment of a Jordan filling with only a cheek piece and wedge slot for cheek pieces and a wedge, such as shown at H in Fig. 1, can be built up or the process can stop at any desired point. In this way segments of 180°, 90° or any other size can be built and if desired, compound cheek pieces can be riveted on to the adjoining knives as shown $C^3$, $C^4$ in Figs. 12 and 17.

The compound cheek piece $C^3$ is made up of a wooden member 110 faced with a metal strip 111 and is fastened to the adjoining knife by rivets such as 112 while compound cheek piece $C^4$ is made up of wooden member 113 faced with a metal strip 114, the whole being held to the adjoining knife by rivets 115.

It is equally obvious that a number of such segmental linings, as for instance, four, with cheek pieces on each side can be used in place of the single knives and separators now assembled in the shell in the paper mill or in place of complete or substantially complete annular sections, such as shown in Fig. 1.

In Figs. 13 and 14, we show one type of machine by which this filling can be assembled.

A represents a fixed jaw or base having preferably a curved face 5 which corresponds with the surface of a truncated conical segment which might be formed by the inner faces of the knives of a Jordan shell filling.

B represents a movable jaw whose inner face 52 corresponds with the inner face of a Jordan shell or the outer face of the filling for such a shell. Jaw B can be moved in and out towards jaw A by means of a piston rod 45 carried by a piston 46 in a cylinder T which may be operated by hydraulic pressure or in any other way. In fact, pressure can be applied to jaw B in any known way.

The purpose of jaws A and B is to clamp a single knife $K^1$ or an assembly such as $K^1$, $W^2$ and $K^2$ or $K^1$, $W^1$, $K^2$, $W^2$, $K^3$ firmly in place so that additional separators and knives when slipped over the rivets can be squeezed up against them as by pressure plate P shown as pivoted to jaw A at 50.

Plate P is provided with passages such as 40 which coincide with the position of the rivets $R^1$, $R^2$ and their respective holes and are operated by means of a piston rod 44 carried by a piston 48 working in a cylinder E. Preferably these cylinders E and T are of the double action type so that the jaw B can be positively advanced and retracted and so that the power arms 47, 47 for plate P can be positively moved back and forth at will.

As shown in Fig. 14, the groups while being assembled can rest on a table such as 48 and, as shown in Fig. 14A, a curved starting guide 49 fastened to table 48 can be used to give the right curve to the assembly.

Figure 22:
Fig. 22 is an isometric view of a top starting guide similar to the bottom starting guide shown in Fig. 14A.

As shown in Figs. 14 and 22, a similar guide 149 can be used for starting the top or the other end on the right curve.

As the knives and woods are assembled, squeezed and locked in position they are moved along between jaws A and B as shown by the dotted lines at X and separators and knives are added, squeezed on, the rivets cut if necessary and headed so that the process is continuous.

As shown in Fig. 10, the skirt or collar such as 11, 12 of the rivets may be omitted and the knives 151 and 152 may be held together with the separator 153 between them by rivets such as 154 which are merely headed at each end.

As shown in Fig. 15, knives such as D, D with cylindrical holes such as 90 with no chamfering and no counter-boring can be used and two knives such as D, D with a separator such as F between them can be bolted together by means of bolts such as G. These bolts G are shown as having heads 93 which are set into recesses such as 94 in an adjoining separator and as having a shank 92 of cylindrical shape which passes through a cylindrical hole at 91 in a separator F, the parts being held together by nuts such as I also located in recesses such as 95 in a separator F.

It is also obvious that rods such as 100, shown in Fig. 16, might be used instead of headed rivets and it is obvious that these could be welded in holes in the respective knives or that one end could be welded to one knife 101 and the other end pushed through a hole in another knife 102 and welded therein. The welding is indicated by 103 and 104.

Figure 18:
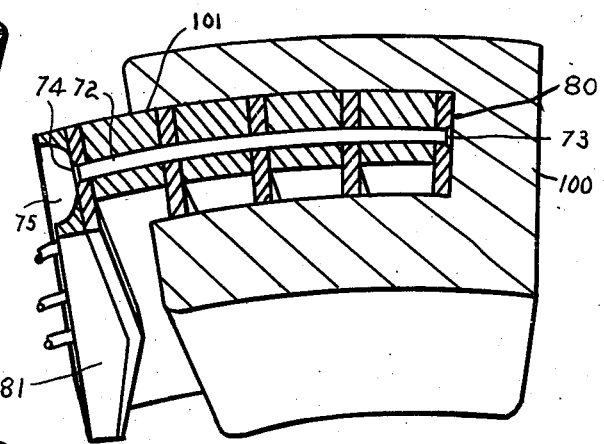
Fig. 18 is a horizontal sectional view showing a different mechanism for assembling a somewhat different type of segment.

In Fig. 18, we show a segment of truncated conical Jordan shell filling in which five knives and four separators have successively been squeezed together against a stop 80 by a pressure arm 81, the knives and separators being originally strung on or pierced by a curved rod 72 with a head 73 at one end. This rod is headed at 74 through the opening 75 in pressure arm 81.

Figure 19:
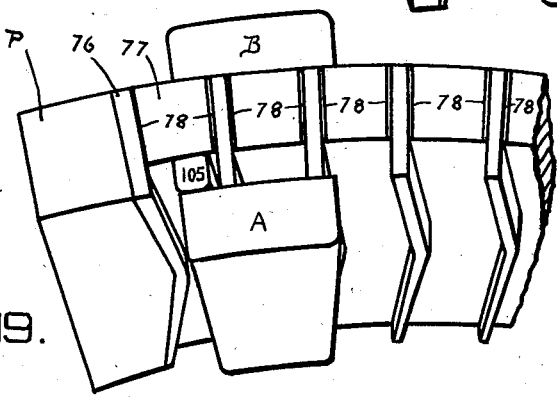
Fig. 19 is a plan view of a mechanism and process applied in assembling a modified type of filling.

In Fig. 19 is shown part of an assembly of knives 76 and separators 77 which have been or are being assembled under pressure by a plate such as P, the parts being separated by glue or cement 78 which holds them together after the pressure plate P has been released.

Figure 21:
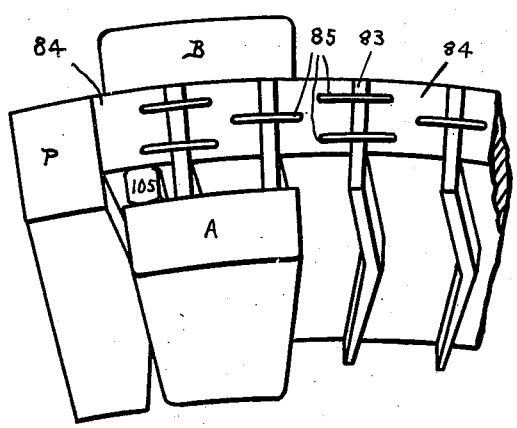
Fig. 21 is a plan view of a machine and of the process used in assembling still another type of filling.

In Fig. 21 is shown a segment of a shell filling made up of knives 83 and separators 84 which are assembled as hereinbefore described except that the pressure plate P bears against a separator 84 instead of a knife 83. While pressure is still applied, the staples 85 are driven at each end into the separators, spanning the knives thereby, locking the assembly together.

As shown in Fig. 18, jaws such as A and B can be dispensed with and a form such as 100 with a suitable cavity 101 together with a power arm or plunger 81 which can enter cavity 101 can be used for successively heading and squeezing knives and separators.

In assembling types of filling such as shown in Figs. 19 and 21 where there are no rivets and no rods to hold the parts together as they are successively assembled, a removable rod 105 of suitable shape can be put between the separator and the fixed jaw so as to keep the separator in place out against the movable jaw while the parts are under pressure from the power plate P.

In Figs. 13 and 14, we show and hereinbefore we describe a single pressure plate P operated by a single cylinder E. While this gives a substantially uniform pressure along the length of any member with which it is in contact, there may be a slight variation between the different ends and in some cases it may be desirable to apply a different pressures at the large end from what there is at the small end.

Figure 20:
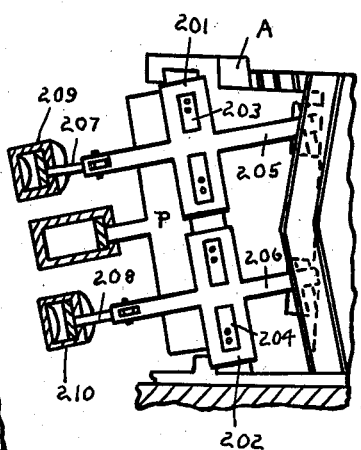
Fig. 20 is a view similar to Fig. 14 with two pressure plates instead of one.

As shown in Fig. 20, we may, therefore, use two or more pressure plates like 201 and 202 with suitable rivet holes 203, 204 each carried by its own arms 205, or 206 and each operated by its own piston 207 or 208 each given power by its own cylinder 209 or 210. With such a device, substantially different pressures can be given if and when different pressures were desirable.

In the claims where the term "member" is used, it applies to the knives, separators whether of wood or other material, cheek pieces, anchor bars or wedges. Where the expression "direction at substantially right angles to the length" is used, it is meant pressure in a direction which is substantially parallel to a plane which is tangent to the outside of the filling as it is when finished.

In the claims there are three elements which more or less limit the meaning. These are a substantially uniform pressure applied at substantially a uniform time along substantially the entire length of a group.

We do not, however, intend to limit ourselves to a process in which all three of these elements are essential.

The pressure may vary more or less from one end of a member to the other end, the time of the application may be somewhat different and it is possible that satisfactory results might be obtained by successively applying pressure from one end of a member to the other thus squeezing the parts together and then holding them by successively heading over rivets or in some such manner, but it is believed more satisfactory results are obtained by applying pressure simultaneously at two or more points or preferably along substantially the entire length of a component member and then locking the parts in place under pressure.

The principal feature of this process is the use of a known and controllable pressure in squeezing together relatively small groups of members and, after the members of each group are so squeezed, of locking them and of then adding on other groups, of squeezing and locking them until a substantially complete segment or section of a circle of almost 360° has been built or any smaller section has been built.

The component members of such a section will all have been subjected to substantially the same pressure and the strength of the assembly will be substantially the same throughout.

We believe we are the first to hold a group of assembled parts in position and then by outside means to squeeze them up together until all voids are filled and the parts are perfectly fitted, whether they are then held or locked in place as by rivets or are merely held together by glue or cement.

We claim:

1. The process of making a section of a preassembled built up lining for a Jordan engine shell which consists of assembling a group of the elements and of holding them in position while predetermined pressure is applied to them in a direction at substantially right angles to the length, of holding the pressed together parts in place and of adding other groups, of applying similar pressure to such groups successively, and of holding such groups together with the preceding group or groups until a larger section of the filling is built up.

2. A machine for assembling a group of knives and separators for a truncated conical Jordan engine shell, which machine includes holding jaws adapted to hold the group in place while a pressure jaw squeezes the members of the group together, and said pressure jaw.

3. A machine for assembling and holding together a group of knives and separators to form a segment of a preassembled lining for a truncated conical Jordan engine shell which machine includes means to hold the group in place while a pressure jaw squeezes the members of the group circumferentially together, and said pressure jaw.

4. The process of making part of a new preassembled lining for a Jordon engine shell which consists of successively assembling small groups of knives and separators, each group forming a short arc, and of applying at substantially the same time substantially the same pressure along substantially the entire length of a knife or separator to squeeze the members of each group together, of locking the members of each group in position while under pressure, of relieving the pressure and then assembling another group and applying similar pressure to squeeze the members together and to the first group, of locking the members of the second group together and to the first group and of adding other groups successively in the same manner.

HAROLD D. STUCK.
PHILIP A. DE NAULT.